(12) United States Patent
Burian

(10) Patent No.: US 10,653,208 B1
(45) Date of Patent: May 19, 2020

(54) COUPLING FOR MAINTAINING CORDS AT A SECURED POSITION AND ASSOCIATED USE THEREOF

(71) Applicant: Richard Burian, Gardena, CA (US)

(72) Inventor: Richard Burian, Gardena, CA (US)

( * ) Notice: Subject to any disclaimer, the term of this patent is extended or adjusted under 35 U.S.C. 154(b) by 89 days.

(21) Appl. No.: 15/975,642

(22) Filed: May 9, 2018

Related U.S. Application Data

(60) Provisional application No. 62/503,807, filed on May 9, 2017.

(51) Int. Cl.
  *A43C 7/00* (2006.01)
  *F16G 11/02* (2006.01)
(52) U.S. Cl.
  CPC ............. *A43C 7/00* (2013.01); *F16G 11/025* (2013.01)
(58) Field of Classification Search
  CPC ... A43C 7/00; Y10T 24/3703; Y10T 24/3711; Y10T 24/2164; Y10T 24/2187; Y10T 24/2183
  See application file for complete search history.

(56) References Cited

U.S. PATENT DOCUMENTS

| | | | | |
|---|---|---|---|---|
| 2,451,247 | A * | 10/1948 | Sims | A43C 7/00 24/713.1 |
| 5,388,315 | A * | 2/1995 | Jones | A43B 3/0078 24/712.1 |
| 7,082,652 | B2 * | 8/2006 | St-Louis | A43C 7/00 24/715.4 |
| 2008/0066273 | A1* | 3/2008 | Liu | A43C 7/00 24/712.5 |
| 2010/0306977 | A1* | 12/2010 | Liu | A43C 7/00 24/713.2 |
| 2010/0313386 | A1* | 12/2010 | Liu | A43B 3/0078 24/326 |

\* cited by examiner

*Primary Examiner* — Robert Sandy
(74) *Attorney, Agent, or Firm* — Ashkan Najafi

(57) ABSTRACT

A shoe lace accessory includes a shoe lace coupling assembly configured to maintain a proximal end and a distal end of an existing shoe lace at a substantially stable position. Such a shoe lace coupling assembly includes a hollow tube having an elongated rectilinear shape provided with an open proximal end and an open distal end axially opposed therefrom, a first fastener detachably engaged with the open proximal end of the hollow tube as well as the proximal end of the existing shoe lace, and a second fastener detachably engaged with the open distal end of the hollow tube as well as the distal end of the existing shoe lace. The first fastener, the second fastener, the proximal end, and the distal end of the existing shoe lace remains located within the open proximal end and the open distal end of the hollow tube.

19 Claims, 2 Drawing Sheets

COUPLING FOR MAINTAINING CORDS AT A SECURED POSITION AND ASSOCIATED USE THEREOF

CROSS REFERENCE TO RELATED APPLICATIONS

This is a non-provisional patent application that claims the benefit of U.S. provisional patent application No. 62/503,807 filed May 9, 2017, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to cord fasteners and, more particularly, to a coupling that maintains cords at a secured position. For example, the coupling can maintain shoelaces secured at all times for rendering laced shoes easier to wear, extending the use of shoelaces, and also offering a decorative shoe accessory. In addition, the coupling may be employed to secure jewelry, necklaces, bracelets, elastic rope belts, chains, etc.

Prior Art

Inventions are always a product of vision and creativity, whether they be world-changing inventions like cars or computers, or everyday conveniences like pump hairsprays, cordless tools, or resealable soda bottles. Some inventions present us with a product that is entirely new, like a cellphone; and before long, such an invention literally changes the way we live. Other inventions combine two already-existing tools or products into one—a snow-scraper and brush, for example—thus reducing the clutter in our lives, and making (in this example, at least) our daily winter chores a little easier. Some inventions deal with common problems, as, for example, roll-on deodorants deal with body odors; others—and again the cellphone is a good example—bring us so much convenience that we didn't know we needed them until they came into being. Many, if not most, inventions include relatively small but highly effective improvements of existing products or technologies. Inventions come in so many categories that counting them all would be difficult—because you never know what might be invented today. Sometimes necessity, sometimes creativity, is the mother of invention. All we can say for certain is that somewhere, someone is even now combining their own vision, imagination, and creativity to create something that will improve, or even revolutionize, our lives.

Accordingly, a need remains for a more effective mechanism to keep cords (e.g., laces, strings, etc.) at a secured position in order to overcome the shortcoming of tangled and untied cords, etc. The exemplary embodiment(s) satisfy such a need by a coupling that maintains cords at a secured position that is convenient and easy to use, lightweight yet durable in design, versatile in its applications, and designed for maintain shoelaces secured at all times for rendering laced shoes easier to wear, extending the use of shoelaces, and also offering a decorative shoe accessory. In addition, the coupling may be employed to secure jewelry, necklaces, bracelets, elastic rope belts, chains, etc.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a shoe lace accessory for maintaining a shoe lace at a secured position. These and other objects, features, and advantages of the non-limiting exemplary embodiment(s) are provided by a shoe lace accessory including a shoe lace coupling assembly configured to maintain a proximal end and a distal end of an existing shoe lace at a substantially stable position. Such a shoe lace coupling assembly includes a hollow tube having an elongated rectilinear shape provided with an open proximal end and an open distal end axially opposed therefrom, a first fastener detachably engaged with the open proximal end of the hollow tube as well as the proximal end of the existing shoe lace, and a second fastener detachably engaged with the open distal end of the hollow tube as well as the distal end of the existing shoe lace. Advantageously, the first fastener and the second fastener are configured to resist external lateral forces exerted thereagainst such that each of the first fastener and the second fastener as well as the proximal end and the distal end of the existing shoe lace remains located within the open proximal end and the open distal end of the hollow tube.

In a non-limiting exemplary embodiment, the hollow tube has a centrally registered longitudinal axis and includes a first interior surface having a first diameter extended along a major longitudinal length of the hollow tube, and a second interior surface having a second diameter extended along a minor longitudinal length of the hollow tube. Notably, the first interior surface is directly abutted against the second interior surface and is contiguous therewith.

In a non-limiting exemplary embodiment, the first interior surface is coaxially aligned with the second interior surface.

In a non-limiting exemplary embodiment, the first diameter is greater than the second diameter.

In a non-limiting exemplary embodiment, the first interior surface is threaded and the second interior surface is smooth.

In a non-limiting exemplary embodiment, the second interior surface is equidistantly offset from the centrally registered longitudinal axis and the second diameter is constant.

In a non-limiting exemplary embodiment, the second diameter is greater than the first diameter. In this manner, the hollow tube further has a circular shoulder disposed at a juncture of the first interior surface and the second interior surface.

In a non-limiting exemplary embodiment, the first fastener includes a first medial end provided with a threaded outer surface wherein the first medial end being threadably mated to the first interior surface and seated inside the hollow tube. A first lateral end is monolithically formed with the first medial end and coaxially aligned therewith such that the first lateral end is configured to releasably receive the proximal end of the existing shoe lace.

In a non-limiting exemplary embodiment, the second fastener includes a second medial end provided with a smooth outer surface. Advantageously, the second medial end is linearly and slidably inserted through the open proximal end of the hollow tube and terminated prior to reaching the open distal end of the hollow tube. A second lateral end is monolithically formed with the second medial end and coaxially aligned therewith. Advantageously, the second medial end has a cross-sectional thickness greater than the second diameter and the second lateral end has a cross-sectional thickness less than the second diameter such that the second medial end abuts directly against the circular shoulder and prohibited from egressing the open distal end of the hollow tube.

The present disclosure further includes a method of utilizing a shoe lace accessory for maintaining a shoe lace at a secured position. Such a method includes the initial step of: providing a shoe lace coupling assembly configured to maintain a proximal end and a distal end of an existing shoe lace at a substantially stable position. Such a shoe lace coupling assembly includes a hollow tube having an elongated rectilinear shape provided with an open proximal end and an open distal end axially opposed therefrom, a first fastener detachably engaged with the open proximal end of the hollow tube as well as the proximal end of the existing shoe lace, and a second fastener detachably engaged with the open distal end of the hollow tube as well as the distal end of the existing shoe lace. The method further includes the step of: the first fastener and the second fastener resisting external lateral forces exerted thereagainst such that each of the first fastener and the second fastener as well as the proximal end and the distal end of the existing shoe lace remains located within the open proximal end and the open distal end of the hollow tube.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
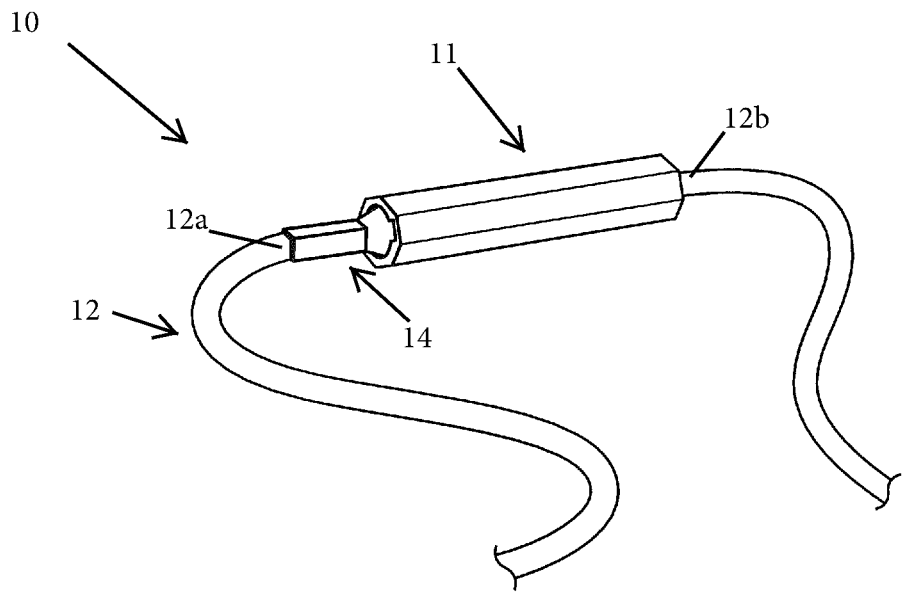
FIG. 1 is a perspective view of a shoe lace accessory, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment (s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

Figure 2:
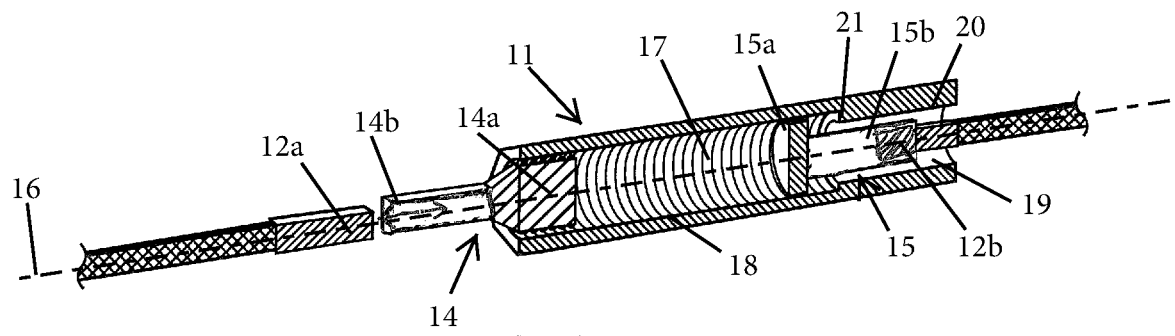
FIG. 2 is a cross-sectional view taken along line 2-2 in FIG. 1.
Figure 3:
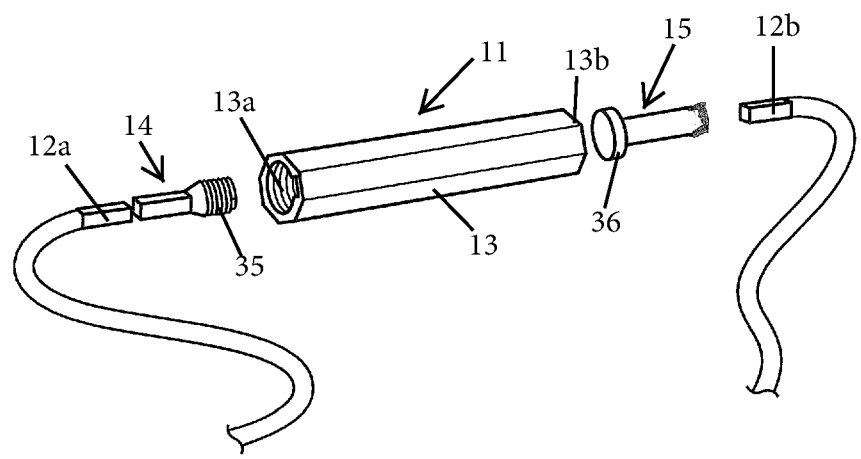
FIG. 3 is an exploded view of the shoe lace accessory shown in FIG. 1.
Figure 4:
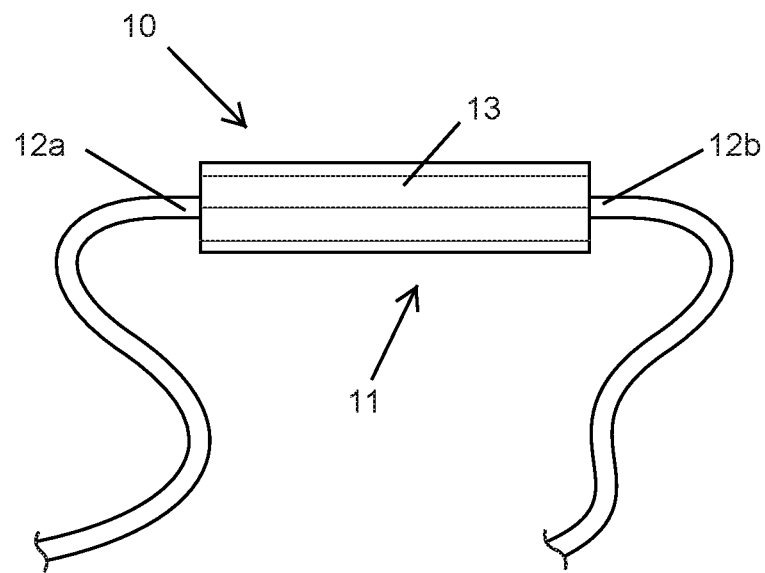
FIG. 4 is a top plan view of the shoe lace accessory shown in FIG. 1.
Figure 5:
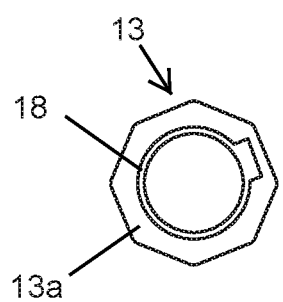
FIG. 5 is a front elevational view illustrating the open proximal end of the hollow tube shown in FIG. 1.
Figure 6:
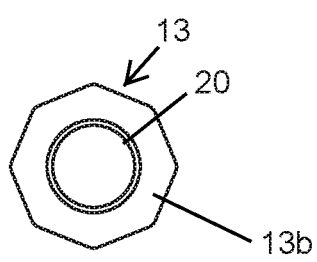
FIG. 6 is a rear elevational view illustrating the open distal end of the hollow tube shown in FIG. 1.

A non-limiting exemplary embodiment(s) of the present disclosure is referred to generally in FIGS. 1-6 and is intended to provide a shoe lace accessory 10 that maintains shoe lace at a secured position. For example, the accessory 10 can maintain shoe laces secured at all times for rendering laced shoes easier to wear, extending the use of shoelaces, and also offering a decorative shoe accessory 10. In addition, the accessory 10 may be employed to secure jewelry, necklaces, bracelets, elastic rope belts, chains, etc. It should be understood that the exemplary embodiment(s) may be used to secure a variety of items, and should not be limited to any particular cord, shoelace, string, etc. described herein.

Referring to FIGS. 1-6, the shoe lace accessory 10 includes a shoe lace coupling assembly 11 configured to maintain a proximal end 12a and a distal end 12b of an existing shoe lace 12 at a substantially stable position. Such a shoe lace coupling assembly 11 includes a hollow tube 13 having an elongated rectilinear shape provided with an open proximal end 13a and an open distal end 13b axially opposed therefrom, a first fastener 14 detachably engaged with the open proximal end 13a of the hollow tube 13 as well as the proximal end 12a of the existing shoe lace 12, and a second fastener 15 detachably engaged with the open distal end 13b of the hollow tube 13 as well as the distal end 12b of the existing shoe lace 12. Advantageously, the first fastener 14 and the second fastener 15 are configured to resist external lateral forces exerted thereagainst such that each of the first fastener 14 and the second fastener 15 as well as the proximal end 12a and the distal end 12b of the existing shoe lace 12 remains located within the open proximal end 13a and the open distal end 13b of the hollow tube 13.

In a non-limiting exemplary embodiment, the hollow tube 13 has a centrally registered longitudinal axis 16 and includes a first interior surface 17 having a first diameter 18 extended along a major longitudinal length of the hollow tube 13, and a second interior surface 19 having a second diameter 20 extended along a minor longitudinal length of the hollow tube 13. Notably, the first interior surface 17 is directly abutted against the second interior surface 19 and is contiguous therewith.

In a non-limiting exemplary embodiment, the first interior surface 17 is coaxially aligned with the second interior surface 19.

In a non-limiting exemplary embodiment, the first diameter 18 is greater than the second diameter 20.

In a non-limiting exemplary embodiment, the first interior surface 17 is threaded and the second interior surface 19 is smooth.

In a non-limiting exemplary embodiment, the second interior surface 19 is equidistantly offset from the centrally registered longitudinal axis 16 and the second diameter 20 is constant.

In a non-limiting exemplary embodiment, the second diameter 20 is greater than the first diameter 18. In this manner, the hollow tube 13 further has a circular shoulder 21 disposed at a juncture of the first interior surface 17 and the second interior surface 19.

In a non-limiting exemplary embodiment, the first fastener 14 includes a first medial end 14a provided with a threaded outer surface 35 wherein the first medial end 14a is threadably mated to the first interior surface 17 and seated inside the hollow tube 13. A first lateral end 14b is monolithically formed with the first medial end 14a and coaxially aligned therewith such that the first lateral end 14b is configured to releasably receive the proximal end 12a of the existing shoe lace 12.

In a non-limiting exemplary embodiment, the second fastener 15 includes a second medial end 15a provided with a smooth outer surface 36. Advantageously, the second medial end 15a is linearly and slidably inserted through the open proximal end 13a of the hollow tube 13 and terminated prior to reaching the open distal end 13b of the hollow tube 13. A second lateral end 15b is monolithically formed with the second medial end 15a and coaxially aligned therewith. Advantageously, the second medial end 15a has a cross-sectional thickness greater than the second diameter 20 and the second lateral end 15b has a cross-sectional thickness less than the second diameter 20 such that the second medial end 15a abuts directly against the circular shoulder 21 and is prohibited from egressing the open distal end 13b of the hollow tube 13.

The present disclosure further includes a method of utilizing a shoe lace accessory 10 for maintaining a shoe lace 12 at a secured position. Such a method includes the initial step of: providing a shoe lace coupling assembly 11 configured to maintain a proximal end 12a and a distal end 12b of an existing shoe lace 12 at a substantially stable position. Such a shoe lace coupling assembly 11 includes a hollow tube 13 having an elongated rectilinear shape provided with an open proximal end 13a and an open distal end 13b axially opposed therefrom, a first fastener 14 detachably engaged with the open proximal end 13a of the hollow tube 13 as well as the proximal end 12a of the existing shoe lace 12, and a second fastener 15 detachably engaged with the open distal end 13b of the hollow tube 13 as well as the distal end 12b of the existing shoe lace 12. The method further includes the step of: the first fastener 14 and the second fastener 15 resisting external lateral forces exerted thereagainst such that each of the first fastener 14 and the second fastener 15 as well as the proximal end 12a and the distal end 12b of the existing shoe lace 12 remains located within the open proximal end 13a and the open distal end 13b of the hollow tube 13.

Referring to FIGS. 1-6 in general, in a non-limiting exemplary embodiment(s), a decorative accessory 10 includes a shoe lace coupling assembly 11 specially designed to keep shoelaces securely tied before, after, and while the footwear is worn; in effect, this clever product helps create "slip-on shoes with laces." Appropriate for children as well as adults, the accessory 10 facilitates the protection of laces, extending their use, while also offering a creative fashion statement. Compact in size and fashioned of a durable metal material, the shoe lace accessory 10 is a cylindrical unit featuring total dimensions of approximately one inch (1") in length and 3/32" in circumference. The product includes a two-part assembly 11: a first fastener for one end of a shoe lace, and a second fastener for the other shoe lace end that features adjustment capabilities.

As designed, the shoe lace accessory 10 may be just as its name implies, extremely easy to use. After attaching the components to the proximal and distal ends of the shoe lace 12, the second fastener is inserted into the hollow tube, locking the unit into place. Twisting the moving, adjustable first fastener allows the shoe lace accessory 10 to tighten the show laces to the desired strength. One need only twist the first fastener in the opposite direction to loosen. For public sale, the shoe lace accessory 10 may be packaged with two (2) units to accommodate a pair of shoe laces. Additionally, as the inventor suggests the product may optimally function with elastic-type shoelaces, the latter could also be sold with the product.

This clever and creative product offers several significant benefits and advantages. Foremost, the shoe lace accessory 10 prove an invaluable tool for the millions of consumers who wear laced footwear on a daily basis. A clip-on unit, this practical accessory 10 ensures that shoestrings are kept neatly secured at all times, alleviating the risk of them loosening to become dirty and frayed from being stepped on and dragging along the ground. As a result, the shoe lace accessory 10 extends the life of laces, eliminating the need to purchase replacement strings too soon. This advantage would be especially appreciated during uncertain economic times where every dollar counts. Additionally, rendering laces tight helps prevent tripping hazards that can result when shoes become untied, a benefit that particularly helps with children's shoes.

As the shoe lace accessory 10 eliminates the need to tie laced shoes in a bow, this product especially benefits seniors and those with limited physical capabilities, whose conditions often prevent them from tying shoes without pain. In this manner, these consumers can enjoy "slip-on shoes with laces" without having to settle for unbecoming footwear outfitted with hook-and-loop fasteners. Offered in sleek stainless steel, this versatile product allows children, teens, and adults to visibly display a comfortable, casual new look that is highly unique in the world of fashion. In this manner, the shoe lace accessory 10 offers a simple, affordable way to buck current trends while maintaining one's own personal style.

The shoe lace accessory 10 is an innovative product that readily enhances the durability and look of stringed footwear. Attractive as well as practical, this line proves an invaluable addition to one's casual wardrobe. Highly functional and affordably priced, the shoe lace accessory 10 is sure to be well received by the general consumer populace, a very sizable market potential. In addition, the shoe lace accessory 10 may be employed to secure jewelry, necklaces, bracelets, elastic rope belts, chains, etc.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A shoe lace accessory for maintaining a shoe lace at a secured position, said shoe lace accessory comprising:
   a shoe lace coupling assembly configured to maintain a proximal end and a distal end of an existing shoe lace at a substantially stable position, said shoe lace coupling assembly including
      a hollow tube having an elongated rectilinear shape provided with an open proximal end and an open distal end axially opposed therefrom,
      a first fastener detachably engaged with said open proximal end of said hollow tube as well as the proximal end of the existing shoe lace, and
      a second fastener detachably engaged with said open distal end of said hollow tube as well as the distal end of the existing shoe lace;
   wherein said first fastener and said second fastener are configured to resist external lateral forces exerted thereagainst such that each of said first fastener and said second fastener as well as the proximal end and the distal end of the existing shoe lace remains located within said open proximal end and said open distal end of said hollow tube.

2. The shoe lace coupling assembly of claim 1, wherein said hollow tube has a centrally registered longitudinal axis and comprises:
   a first interior surface having a first diameter extended along a major longitudinal length of said hollow tube;
   a second interior surface having a second diameter extended along a minor longitudinal length of said hollow tube;
   wherein said first interior surface is directly abutted against said second interior surface and is contiguous therewith.

3. The shoe lace coupling assembly of claim 2, wherein said first interior surface is coaxially aligned with said second interior surface.

4. The shoe lace coupling assembly of claim 3, wherein said first diameter is greater than said second diameter.

5. The shoe lace coupling assembly of claim 4, wherein said first interior surface is threaded and said second interior surface is smooth.

6. The shoe lace coupling assembly of claim 5, wherein said second interior surface is equidistantly offset from the centrally registered longitudinal axis and said second diameter is constant.

7. The shoe lace coupling assembly of claim 6, wherein said hollow tube further has a circular shoulder disposed at a juncture of said first interior surface and said second interior surface.

8. The shoe lace coupling assembly of claim 7, wherein said first fastener comprises:

a first medial end provided with a threaded outer surface, said first medial end being threadably mated to said first interior surface and seated inside said hollow tube; and a first lateral end monolithically formed with said first medial end and coaxially aligned therewith;

wherein said first lateral end is configured to releasably receive the proximal end of the existing shoe lace.

9. The shoe lace coupling assembly of claim 8, wherein said second fastener comprises:

a second medial end provided with a smooth outer surface, said second medial end being linearly and slidably inserted through said open proximal end of said hollow tube and being terminated prior to reaching said open distal end of said hollow tube; and a second lateral end monolithically formed with said second medial end and coaxially aligned therewith;

wherein said second medial end has a cross-sectional thickness greater than said second diameter and said second lateral end has a cross-sectional thickness less than said second diameter such that said second medial end abuts directly against said circular shoulder and prohibited from egressing the open distal end of said hollow tube.

10. A shoe lace accessory for maintaining a shoe lace at a secured position, said shoe lace accessory comprising:

a shoe lace coupling assembly configured to maintain a proximal end and a distal end of an existing shoe lace at a substantially stable position, said shoe lace coupling assembly including a hollow tube having an elongated rectilinear shape provided with an open proximal end and an open distal end axially opposed therefrom, a first fastener detachably engaged with said open proximal end of said hollow tube as well as the proximal end of the existing shoe lace, and a second fastener detachably engaged with said open distal end of said hollow tube as well as the distal end of the existing shoe lace;

wherein said first fastener and said second fastener are configured to resist external lateral forces exerted thereagainst such that each of said first fastener and said second fastener as well as the proximal end and the distal end of the existing shoe lace remains located within said open proximal end and said open distal end of said hollow tube;

wherein said first fastener is spaced from said second fastener.

11. The shoe lace coupling assembly of claim 10, wherein said hollow tube has a centrally registered longitudinal axis and comprises:

a first interior surface having a first diameter extended along a major longitudinal length of said hollow tube;

a second interior surface having a second diameter extended along a minor longitudinal length of said hollow tube;

wherein said first interior surface is directly abutted against said second interior surface and is contiguous therewith.

12. The shoe lace coupling assembly of claim 11, wherein said first interior surface is coaxially aligned with said second interior surface.

13. The shoe lace coupling assembly of claim 12, wherein said first diameter is greater than said second diameter.

14. The shoe lace coupling assembly of claim 13, wherein said first interior surface is threaded and said second interior surface is smooth.

15. The shoe lace coupling assembly of claim 14, wherein said second interior surface is equidistantly offset from the centrally registered longitudinal axis and said second diameter is constant.

16. The shoe lace coupling assembly of claim 15, wherein said hollow tube further has a circular shoulder disposed at a juncture of said first interior surface and said second interior surface.

17. The shoe lace coupling assembly of claim 16, wherein said first fastener comprises:

a first medial end provided with a threaded outer surface, said first medial end being threadably mated to said first interior surface and seated inside said hollow tube; and a first lateral end monolithically formed with said first medial end and coaxially aligned therewith;

wherein said first lateral end is configured to releasably receive the proximal end of the existing shoe lace.

18. The shoe lace coupling assembly of claim 17, wherein said second fastener comprises:

a second medial end provided with a smooth outer surface, said second medial end being linearly and slidably inserted through said open proximal end of said hollow tube and being terminated prior to reaching said open distal end of said hollow tube; and a second lateral end monolithically formed with said second medial end and coaxially aligned therewith;

wherein said second medial end has a cross-sectional thickness greater than said second diameter and said second lateral end has a cross-sectional thickness less than said second diameter such that said second medial end abuts directly against said circular shoulder and prohibited from egressing the open distal end of said hollow tube.

19. A method of utilizing a shoe lace accessory for maintaining a shoe lace at a secured position, said method comprising the steps of:

providing a shoe lace coupling assembly configured to maintain a proximal end and a distal end of an existing shoe lace at a substantially stable position, said shoe lace coupling assembly including a hollow tube having an elongated rectilinear shape provided with an open proximal end and an open distal end axially opposed therefrom, a first fastener detachably engaged with said open proximal end of said hollow tube as well as the proximal end of the existing shoe lace, and a second fastener detachably engaged with said open distal end of said hollow tube as well as the distal end of the existing shoe lace; and said first fastener and said second fastener resisting external lateral forces exerted thereagainst such that each of said first fastener and said second fastener as well as the proximal end and the distal end of the existing shoe lace remains located within said open proximal end and said open distal end of said hollow tube.

* * * * *